(12) United States Patent
Dewitz

(10) Patent No.: US 9,410,602 B2
(45) Date of Patent: Aug. 9, 2016

(54) TRANSMISSION-PRELOADING METHOD FOR MEASURING AND TESTING A TRANSMISSION, IN PARTICULAR A DOUBLE CLUTCH TRANSMISSION, WHICH HAS AT LEAST TWO SUB-TRANSMISSIONS

(71) Applicant: THYSSENKRUPP SYSTEM ENGINEERING GMBH, Heilbronn (DE)

(72) Inventor: Ingo Dewitz, Hannover (DE)

(73) Assignee: Thyssenkrupp System Engineering GmbH, Heilbronn (DE)

( * ) Notice: Subject to any disclaimer, the term of this patent is extended or adjusted under 35 U.S.C. 154(b) by 392 days.

(21) Appl. No.: 14/157,954

(22) Filed: Jan. 17, 2014

(65) Prior Publication Data

US 2014/0130625 A1      May 15, 2014

Related U.S. Application Data

(63) Continuation of application No. PCT/EP2012/064238, filed on Jul. 19, 2012.

(30) Foreign Application Priority Data

Jul. 20, 2011   (DE) .......................... 10 2011 108 013

(51) Int. Cl.
  *G01M 13/02*   (2006.01)
  *G01M 15/00*   (2006.01)
  *F16H 3/08*    (2006.01)
  *F16H 61/688*  (2006.01)

(52) U.S. Cl.
  CPC ............... *F16H 3/08* (2013.01); *G01M 13/025* (2013.01); *G01M 13/028* (2013.01); *F16H 61/688* (2013.01); *Y10T 74/19251* (2015.01)

(58) Field of Classification Search
  CPC ............................. G01M 15/00; G01M 13/02
  USPC ........................................................ 73/115.02
  See application file for complete search history.

(56) References Cited

U.S. PATENT DOCUMENTS 4,356,724 A    11/1982  Ayoub et al.
5,537,865 A *   7/1996  Shultz ................ G01M 13/025
                                                 73/115.02

FOREIGN PATENT DOCUMENTS

| DE | 56 375 A1 | 1/1966 |
| DE | 19537639 A1 | 4/1997 |
| DE | 19934486 A1 | 1/2001 |
| DE | 10 2004 037 982 A1 | 2/2006 |
| DE | 10 2006 012 759 A1 | 9/2007 |

* cited by examiner

*Primary Examiner* — Lisa Caputo
*Assistant Examiner* — Jamel Williams
(74) *Attorney, Agent, or Firm* — McNees Wallace & Nurick LLC

(57) ABSTRACT

A method for testing a transmission, in particular a double clutch transmission, is provided. A torque is introduced into the transmission by means of a drive unit that is external relative to the transmission, and the transmission is switched to an operating state in which an internal component of the transmission functions as a brake in order to simulate an output unit.

15 Claims, 12 Drawing Sheets

1a

1b

TRANSMISSION-PRELOADING METHOD FOR MEASURING AND TESTING A TRANSMISSION, IN PARTICULAR A DOUBLE CLUTCH TRANSMISSION, WHICH HAS AT LEAST TWO SUB-TRANSMISSIONS

CROSS REFERENCE TO RELATED APPLICATIONS

This application is a Continuation of International Application No. PCT/EP2012/064238, filed on Jul. 19, 2012, entitled TRANSMISSION-PRELOADING METHOD FOR MEASURING AND TESTING A TRANSMISSION, IN PARTICULAR A DOUBLE CLUTCH TRANSMISSION, WHICH HAS AT LEAST TWO SUB-TRANSMISSIONS, which application is hereby incorporated by reference in its entirety.

BACKGROUND

The invention relates to a transmission-preloading method for the measurement and testing of a transmission, in particular a dual-clutch transmission, which has at least two component transmissions, in which method a torque is introduced into the, in particular, dual-clutch transmission by means of a drive unit which is external with respect to the transmission and defined with respect to traction operation.

"Traction operation" refers to operation which corresponds to traction operation of a vehicle in which a drive unit, in particular a drive unit in the form of an engine, introduces torques into a dual-clutch transmission via clutches, wherein said torques are then ultimately output via an output unit, for example and in particular via wheels fastened to a vehicle and the shafts of said wheels.

Thus, during non-traction operation, specifically in the parked state, the output unit, specifically the wheels together with the associated shafts, become part of the drive unit in the physical sense, because corresponding torques are then introduced via the tires and shafts to a parking lock, with generally engaging pawl element, into the dual-clutch transmission, wherein, however, by the definitions according to the invention, this concerns, like before, an output unit, because said expression relates to traction operation and not the parked state.

Transmissions, including dual-clutch transmissions, are normally driven by a drive motor, which in transmission-preloading testing and measurement steps is external with respect to the transmission, such that a torque is introduced into the transmission. Furthermore, it is conventionally the case in the prior art that, in transmission-preloading testing and measurement steps, in particular the NVH test, parking lock test and the recording of a clutch characteristic curve, an output motor is generally provided which is again external with respect to the transmission and defined with respect to traction operation, such that the torque that is generally introduced into the transmission by the drive motor in traction operation is in turn provided as output drive outside the transmission at the output motor, wherein, in the parking lock test, the classic output motor then functions, during the test itself, as a drive motor in order to introduce a corresponding torque into the parking lock and/or the pawl element thereof into the transmission.

Depending on the geometry of the transmission, the drive motor, transmission and output motor are situated in alignment, wherein they may however also be arranged in parallel or at right angles or with an offset depending on the transmission geometry.

Thus, in the case of all of said tests, it is generally the case that at least two units, specifically an output unit and a drive unit, are required outside the transmission for testing, said units being extremely bulky and thus being required in a transmission test and measurement apparatus for this purpose and self-evidently also with regard to dual-clutch transmissions, especially as this is associated with not inconsiderable investment costs.

The statements made above thus yield the object or the underlying problem of the present invention, specifically that of at least partially eliminating or minimizing the above-mentioned disadvantages, in particular providing a transmission-preloading method for the measurement and testing of a transmission, in particular a dual-clutch transmission, which has at least two component transmissions, and a corresponding testing and measurement apparatus which takes up little spatial volume, and the method can be performed inexpensively and the apparatus can be produced inexpensively.

SUMMARY

The method according to the invention and the test stand according to the invention have the advantage over the prior art that the internal components of the transmission for testing are utilized to generate a preload in the transmission. The preload is generated by virtue of the internal component functioning as a brake, in particular as a friction brake. The internal component thus operates as an output unit, such that no external output unit, for example in the form of a further electric motor, is required. The internal component preferably comprises an only partially engaged clutch of the transmission. It is conceivable here for a first clutch side of the clutch to be coupled to a first transmission region of the transmission, said first transmission region being driven by the drive unit, and for a second clutch side to be coupled to a second transmission region which is driven by means of the drive unit with a different transmission ratio than the first transmission region. A friction force which functions as a brake is generated between the clutch disks of the clutch, whereby the transmission is preloaded. In said preloaded state of the transmission, it is then possible for NVH structure-borne noise measurements to be performed. It is also conceivable that, in said preloaded state of the transmission, a clutch characteristic curve is recorded by virtue of the clutch being engaged to just such an extent that no slip occurs at the clutch, and then the clutch torque is determined as a function of the degree of clutch engagement or of the clutch engagement travel.

In a preferred embodiment, the transmission comprises at least one dual-clutch transmission having a first component clutch which is provided for the coupling-in of a first component transmission of the transmission and having a second component clutch which is provided for the coupling-in of a second component transmission of the transmission. The first and second component transmissions are provided for establishing different gears between the input shaft and the output shaft of the dual-clutch transmission. The first component clutch is fully engaged in order to transmit the torque of the drive unit from an input shaft of the transmission to the first component transmission. The second component clutch is only partially engaged. Here, both a gear of the first component transmission and also a gear of the second component transmission are engaged in order to couple both the first component transmission and also the second component transmission to an output shaft of the transmission. The torque introduced by the drive unit is transmitted via the output shaft from the first component transmission to the second component transmission. Since the engaged gear of the first component transmission inevitably has a different transmission ratio than the engaged gear of the second component transmission, a rotational speed difference arises between the clutch disks in the second component clutch. Said rotational speed difference has the effect that slip arises at the second component clutch, and the second component clutch thus functions as a friction brake. In this state, the above-described NVH measurements are performed and/or the clutch characteristic curve is recorded. A changeover is preferably performed between the degrees of clutch engagement of the first component clutch and of the second component clutch, that is to say the first component clutch is, after a period of time, transferred from the fully engaged (slip-free) state into the only partially engaged (slipping) state, whereas the second component clutch is transferred from the only partially engaged (slipping) state into the fully engaged (slip-free) state, in order to simulate a changeover between traction operation and operation under load between the meshing gearwheels of the first and second component transmissions.

The present invention also relates to a method for the testing of a transmission, in particular a dual-clutch transmission, wherein a torque is introduced into the transmission by means of a drive unit which is external with respect to the transmission, and wherein the transmission is placed into an operating state in which the transmission is blocked by means of at least one internal component of the transmission. It is thus advantageously possible to perform a parking lock test in which it is checked whether the transmission remains locked up to a defined maximum parking torque in the parked state. The at least one internal component preferably comprises a parking lock which, as a locking lever, is placed into engagement with a transmission element, whereby a rotation of said transmission element is prevented. It is alternatively conceivable for the transmission to be locked by means of internal components in the form of gearwheels of at least two different gears of the transmission, by virtue of the at least two different gears being engaged simultaneously. Since the two gears inevitably have a different transmission ratio, the transmission is blocked by the simultaneous engagement of two gears. In this state, the clutch of the transmission is preferably fully engaged, and the torque introduced by the drive unit is increased up to the defined maximum parking torque. Here, it is checked whether the transmission remains blocked. It is also conceivable here for the transmission to comprise a first component clutch and a second component clutch, wherein the first component clutch is provided for the coupling-in of a first component transmission and the second component clutch is provided for the coupling-in of the second component transmission. The first component clutch is then fully engaged, while the second component clutch preferably remains disengaged. To perform the parking lock test, two gears of the first component transmission are then engaged simultaneously. Alternatively, a gear of the first component transmission and two gears of the second component transmission are engaged. The transmission is thus locked either by the first component transmission or by the second component transmission, such that the parking lock test can be performed by means of the drive unit.

According to the invention, the transmission, in particular dual-clutch transmission, which has at least two component transmissions is placed into an operating state in which the introduced torque is absorbed by means of at least one part of the transmission, for example and in particular by means of friction-lining-type clutches of the component clutches of the component transmission, such that the measurement and/or testing is performed without an output unit which is external with respect to the transmission and defined with respect to traction operation. On the basis of the above explanations, it is then the case that, in non-traction operation, that is to say in the parked state, the output unit is then in a physical sense the drive unit (see above), wherein according to the invention and by definition, however, in the method according to the invention, a transmission is measured and tested in traction operation but also in the parked state (the parking lock test which follows and which will be explained in more detail below), such that with regard to the parking lock test—that is to say in non-traction operation—the physical drive and output units are in effect reversed, such that, for standardization of the expressions, traction operation has been taken as a reference in order to avoid confusion of expressions between traction operation tests and measurements and tests—specifically the so-called parking lock test—that take place in the parked state, and in order to use uniform terminology according to the invention with regard to drive and output unit.

According to the invention, the expression "disengaged" refers to the state in which two clutch disks are fully out of engagement with one another. According to the invention, the expression "partially engaged" refers to the state in which two mutually corresponding clutch disks are pressed against one another with only a part of their maximum specified force, and thus the corresponding clutch is only partially engaged. According to the invention, the expression "fully engaged" is to be understood to mean the state in which two mutually corresponding clutch disks are pressed against one another with their maximum specified force, as a function of materials and geometries of the clutch disks, in order that the maximum transmissible torque is determined. It is thus self-evident to a person skilled in the art that, in the physical sense, there is in effect no maximum force that leads to "full engagement" because, from certain point in time above the maximum clutch torque, slip indeed then occurs again.

Furthermore, the expression "component clutch" is to be understood to mean a clutch that belongs to a component transmission of a transmission that has at least two component transmissions.

Furthermore, according to the invention, the expression "clutch torque" is to be understood to mean the torque acting at a clutch.

According to the invention, the expression "slipping" is to be understood to mean the state of a clutch in which there is a rotational speed difference between the two clutch disks of a clutch. Slip thus arises, wherein heat is generated on the clutch disks owing to the friction of the clutch disks against one another. According to the invention, "slip-free" is to be understood to mean the state of a clutch in which there is no rotational speed difference between the two clutch disks of a clutch, such that no slip-induced heat is generated at the clutch disks.

According to the invention, the transmission-preloading method for the measurement and testing for example and in particular of a dual-clutch transmission is for example and in particular a so-called NVH (Noise, Vibration and Harshness; noise testing in the transmission during ongoing operation in order to identify faults) test, the recording of a clutch characteristic curve, and the parking lock test already mentioned above.

In the transmission-preloading method according to the invention, for the measurement and testing of a for example and in particular dual-clutch transmission, a drive unit which is external with respect to the dual-clutch transmission and defined with respect to traction operation (see explanations above) is used to introduce a torque into the dual-clutch transmission, wherein the dual-clutch transmission is placed into an operating state in which the introduced torque is absorbed by means of at least one part of the dual-clutch transmission, such that the measurement and/or testing is performed without an output unit which is external with respect to the dual-clutch transmission and defined with respect to traction operation. In other words: there is no need for an external output unit for simulating actual traction operation.

In an NVH test (noise test of the transmission for testing), drive is output, with slip, in at least one component clutch of the transmission, this being generated by slipping, partial engagement of at least one component clutch of a component transmission, wherein a gear is engaged in each component transmission, wherein
a) the one component clutch of the first component transmission is partially engaged so as to exhibit slip and the one component clutch of the second component transmission is partially to fully engaged without slip, and no component clutch is disengaged, or
b) the one component clutch of the second component transmission is partially engaged so as to exhibit slip and the one component clutch of the first component transmission is partially to fully engaged without slip, and no component clutch is disengaged.

In both cases, there is then self-evidently a gear engaged in each component transmission, such that the generation of the required output torque is generated through preloading of the two component transmissions, that is to say of the transmission itself. By means of the slipping clutch, it is ensured that the component transmissions themselves are not locked, which is not permitted in the NVH test because, as the individual gears are run through, with a generally constant degree of clutch engagement of the component clutches, from a starting rotational speed up to a predefined maximum rotational speed, various sensors on the transmission are used to detect acoustic artifacts that indicate problems and faults of the, in particular, dual-clutch transmission. In the NVH test, shifting through the different gears is generally performed in order to check the gearwheels of the individual gears, but also the other gearwheels in the transmission and further elements for full functionality.

By means of the partial engagement of the clutch disks with one another, it is self-evidently possible for this to result, in effect, in a part of the introduced torque being converted, with output drive action, into heat, said heat being generated because the clutch disks are functioning as a friction brake.

It is also advantageous for the two variants to be realized successively in any sequence in order thereby to test the gearwheel pairing of the respective gear in traction operation and in overrun operation. By means of the changeover of the slipping component clutch, the changeover between traction operation and overrun operation is "simulated".

In this context, it is particularly advantageous for the transmission ratios of the engaged gears of the two component transmissions, while being unequal (inequality being necessary because, in the event of equality of the transmission ratios, these would then cancel one another out and there would ultimately be no rotational speed difference between the clutch disks of the partially engaging clutch or of the partially engaging clutches, said rotational speed difference however being necessary for the reasons mentioned above in order to ensure an internal output of drive in order thereby to be able to dispense, according to the invention, with an external output unit), to be similar, and in this regard, with the engagement of the two component transmissions maintained, the rotational speed difference between the clutch disks of the slipping clutch of a component transmission is minimized because, by means of a small transmission ratio difference of the simultaneously engaged gears, the rotational speed difference between the clutch disks of the clutch or of the clutches is kept low, and thus there are low frictional losses, in order thereby to mechanically preserve the clutches and the transmission for testing.

In the case of a first parking lock test, a locking element, for example and in particular in the form of a pawl, engages into a component transmission, for example and in particular into a gearwheel which is connected via shafts and gearwheels to a shaft of a component transmission so as to lock the latter, wherein the drive unit, via said component transmission, preloads the parking lock unit, wherein a gear of said component transmission is engaged and a component clutch of said component transmission is partially to fully engaged so as to exhibit slip or without slip, in order generally to check whether the locking element withstands a maximum parking torque, that is to say performs its function. The component clutch of the first component transmission may however also be fully engaged, wherein it is basically merely necessary for the introduced torque not to exceed a certain upper limit in order firstly to ensure that, when later installed in a vehicle, when said vehicle is on a hill, said vehicle is then actually held by the parking lock itself and the vehicle is also held parked by the parking lock itself, and secondly, however, the mechanical load capacity is not made excessively high in order to prevent any mechanical damage to the locking element, the so-called parking lock or parking pawl. Thus, according to the invention, a certain torque of the external drive unit is introduced via a component clutch, wherein, via an engaged gear of the one component transmission, considered formally proceeding from the transmission ratio side of the engaged gear, the torque is transmitted, already with output action, to the locking element, specifically in order to test whether the locking element withstands said torque. Accordingly to the invention, therefore, there is no longer a need for an external output unit (as explained above with regard to traction operation), because the torque to be applied to the locking element is applied not via the external output device but rather via the external drive device through the one component clutch and the one component transmission.

In general, it is pointed out at this juncture that the designation "first and second component clutches" and "first and second component transmissions" self-evidently encompasses a situation in which, depending on which transmission is defined as first component transmission and which component clutch is defined as first component clutch, the other component clutch and the other component transmission are then self-evidently referred to as second component transmission and second component clutch, such that, depending on definition, said designations may in an absolute sense also be reversed.

In a further parking lock test,
a) at least two gears of a second component transmission are engaged and a gear of a first component transmission, wherein the component clutch of the first component transmission is partially to fully engaged so as to exhibit slip or without slip, or
b) at least two gears of a first component transmission are engaged and a gear of a second component transmission is engaged, wherein the component clutch of the second component transmission is partially to fully engaged so as to exhibit slip or without slip,
in order to test, in both variants, whether the in each case two engaged gears withstand a maximum parking torque, that is to say a predefined maximum torque that must be withstood in the parked state, that is to say whether said gears perform a parking lock function.

In one embodiment of the method according to the invention, for the recording of a clutch characteristic curve of a component clutch in a component transmission of an, in particular, dual-clutch transmission, drive is output, with slip, in one component clutch, this being generated by slipping, partial engagement of a component clutch of a component transmission, wherein a gear is engaged in each component transmission, wherein
a) the one component clutch of the first component transmission is partially engaged so as to exhibit slip and the one component clutch of the second component transmission is partially to fully engaged without slip, and no component clutch is disengaged, wherein the clutch torque is determined as a function of the degree of clutch engagement and/or the clutch engagement travel, or
b) the one component clutch of the second component transmission is partially engaged so as to exhibit slip and the one component clutch of the first component transmission is partially to fully engaged without slip, and no component clutch is disengaged, wherein the clutch torque is determined as a function of the degree of clutch engagement and/or the clutch engagement travel.

In this embodiment, for the recording of a clutch characteristic curve, the respective transmission input shafts move, whereas in the following variants for the recording of a clutch characteristic curve, the transmission input shafts do not rotate because they are locked.

In general, during the recording of the clutch characteristic curve of a component clutch in a component transmission, the rotational speed of the external drive unit or of the corresponding transmission input shaft is kept constant.

In one variant of the method according to the invention for the recording of a clutch characteristic curve of a component clutch in a component transmission of an, in particular, dual-clutch transmission, at least two gears of the one component transmission are engaged, wherein the component clutch of the component transmission is partially to fully engaged so as to exhibit slip and the clutch torque generated by the external drive unit is determined as a function of the degree of clutch engagement and/or the clutch engagement travel. As a result of the locking of the component transmission owing to the at least two engaged gears, it is possible for the respective clutch torque to be determined without rotation of the respective transmission input shafts, by contrast to the first embodiment described above.

In one variant of the method according to the invention for the recording of a clutch characteristic curve of a component clutch in a component transmission, at least one gear of the one component transmission is engaged, and a locking element engages into said component transmission, commonly into a gearwheel, which is connected via shafts and gearwheels to a shaft of said component transmission so as to lock the latter, wherein the component clutch of said component transmission is at least partially engaged so as to exhibit slip and the clutch torque generated by the external drive unit is determined as a function of the degree of clutch engagement and/or the clutch engagement travel. As a result of the locking of the component transmission by means of locking element, it is possible for the respective clutch torque to be determined without rotation of the respective transmission input shaft.

In a further variant of the method according to the invention, during recording of a clutch characteristic curve in a component transmission, at least one gear of the one component transmission is engaged and at least two gears of a further component transmission are engaged,
a) wherein a component clutch of the further component transmission is disengaged, wherein a component clutch of the one component transmission is partially to fully engaged so as to exhibit slip, and the clutch torque is determined as a function of the degree of clutch engagement and/or the clutch engagement travel, or
b) a component clutch of the one component transmission is disengaged, wherein a component clutch of the further component transmission is partially to fully engaged so as to exhibit slip, and the clutch torque is determined as a function of the degree of clutch engagement and/or the clutch engagement travel.

As a result of the locking of the first component transmission owing to the two engaged gears of the second component transmission, and the fact that the two component transmissions are mechanically connected to one another, determination of the respective clutch torque is possible without rotation of the respective transmission input shaft.

A transmission testing and measurement apparatus according to the invention, in particular dual-clutch transmission testing and measurement apparatus, having a drive unit which drives the transmission for testing, in particular dual-clutch transmission, which has at least two component transmissions, has no output unit which is external with respect to the transmission for testing and defined with respect to traction operation.

It is advantageous for the transmission measurement and testing apparatus according to the invention, in particular for dual-clutch transmissions, to be designed such that, during a transmission-preloading method for the measurement and testing of a transmission, in particular dual-clutch transmission, which has at least two component transmissions, a drive unit which is external with respect to the transmission is used to introduce a torque into the transmission, wherein the transmission is or can be placed into an operating state in which the introduced torque is absorbed by means of at least one part of the transmission such that the measurement and/or testing is or can be performed without an output unit which is external with respect to the transmission and defined with respect to traction operation.

Finally, it is advantageous for the apparatus according to the invention to be designed such that the method according to the invention is or can be performed during operation. The devices for the measurement and testing are composed substantially of individual units, known from the prior art, for performing the above-mentioned tests, wherein in particular, the simultaneous engagement of different gears in one or even more component transmissions or in both component transmissions of the double-clutch transmission is also possible.

Other transmission-preloading measurement and testing methods are also conceivable according to the invention, for example and in particular the movement of clutches toward engagement, control of the micro-slip at the clutch, and the measurement of the torque uniformity. The method according to the invention, the apparatus and the uses self-evidently also relate to transmissions that have more than two component transmissions.

BRIEF DESCRIPTION OF THE FIGURES

The invention will now be explained in more detail on the basis of the following drawings in non-restrictive fashion, wherein, in the figures.

DETAILED DESCRIPTION

Figure 1:
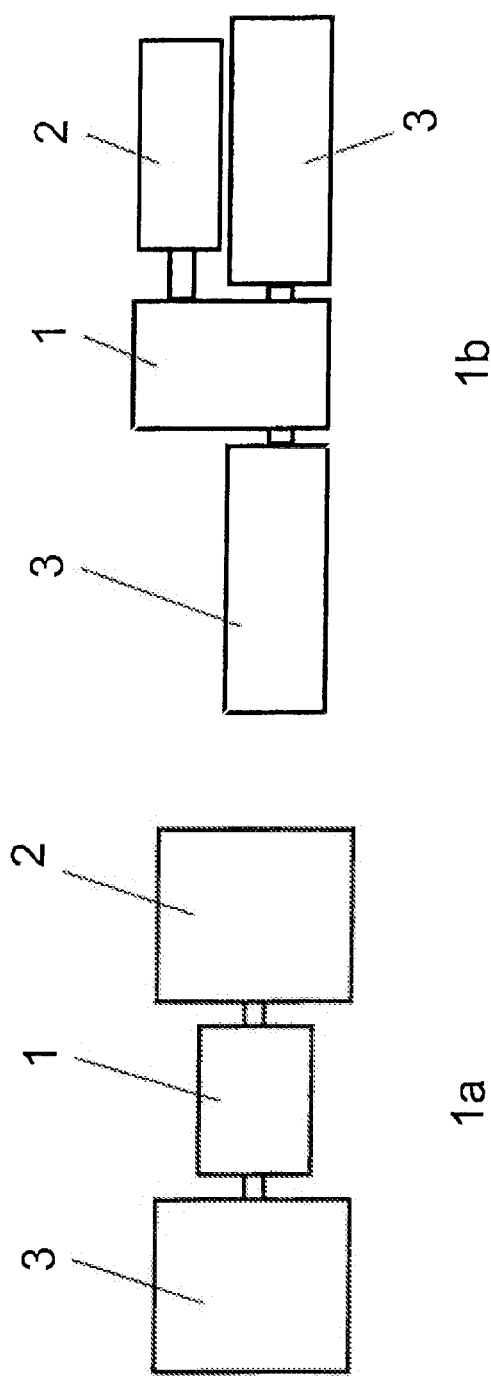
FIG. 1 shows a diagrammatic sketch of apparatuses for the testing and measurement of vehicle transmissions.

FIG. 1 shows, in the form of a sketch, the principle of the hitherto conventional transmission testing apparatuses—also referred to as transmission test stands—in which a transmission 1 for testing and measurement is driven by means of a drive unit 2, commonly in the form of an electric drive motor, such that, via the transmission 1, the introduced torque is finally provided as output drive via an output unit 3, generally via an electric motor. In this way, the transmission 1 for testing and measurement has a preload imparted to it in order for corresponding tests and measurements, in particular NVH tests, parking lock tests and also recordings of clutch characteristic curves, to then be performed.

In FIG. 1, the designation 1a indicates a transmission testing apparatus in which a transmission of front longitudinal type of construction is tested and measured, whereas in FIG. 1, at the designation 1b, a transmission of front transverse type of construction is tested and measured, wherein in the latter arrangement, an output unit 3 is arranged parallel to the drive unit 1 and a second output unit 3 is arranged on the side situated opposite the first output unit 3, wherein all of the drive and output units are of electromotive design.

Said conventional transmission testing apparatuses, which are known from the prior art and which are used for dual-clutch transmissions and in which the transmission must be preloaded during the measurements and tests, are relatively large-volume apparatuses, which are furthermore relatively expensive.

Figure 2:
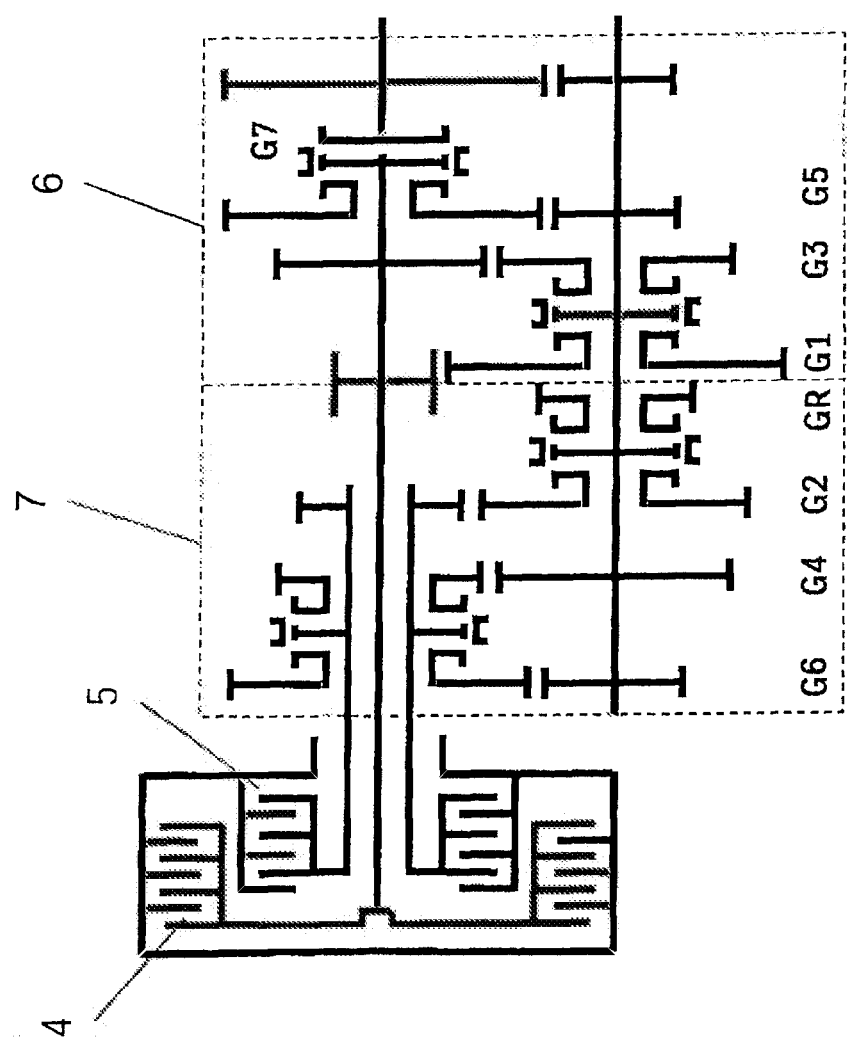
FIG. 2 shows a diagrammatic sketch of a dual-clutch transmission of longitudinal type of construction.

FIG. 2 is a schematic functional illustration of a dual-clutch transmission of longitudinal type of construction. The illustration shows a first component clutch 4 and a second component clutch 5 and the clutch disks thereof, wherein the first component clutch 4, at least in the case of partial engagement of the clutch disks with one another, transmits a torque, introduced by a drive unit (not shown), into a first component transmission 6, wherein for the second component clutch 5, this applies correspondingly to a second component transmission 7. A reverse gear GR, a second gear G2, a fourth gear G4 and a sixth gear G6 belong to the second component transmission, wherein a first gear G1, a third gear G3, a fifth gear G5 and a seventh gear G7 belong to the first component transmission.

Figure 3:
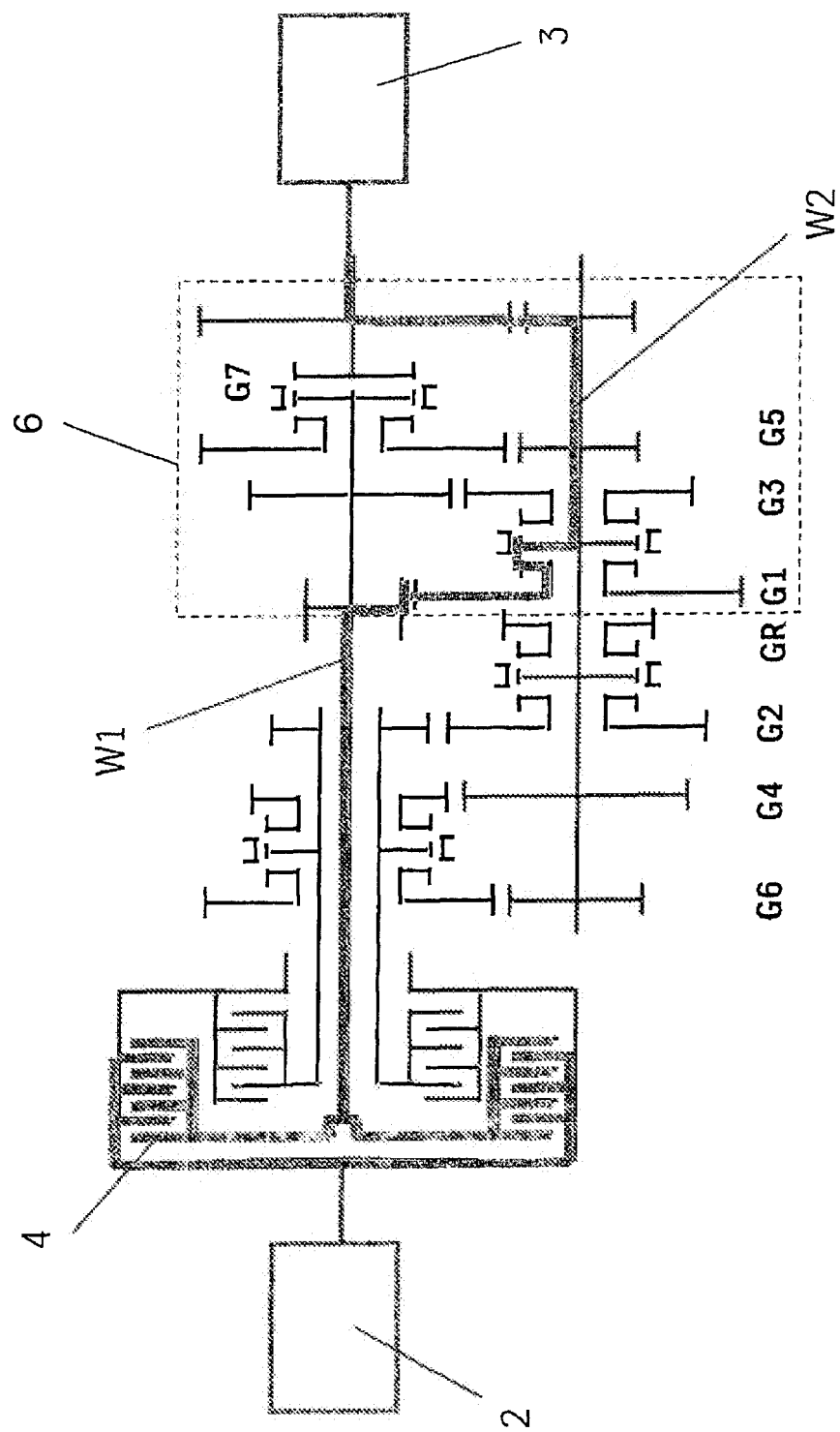
FIG. 3 shows a diagrammatic sketch of a power flow in the dual-clutch transmission shown in FIG. 2 with a first gear engaged.

FIG. 3 shows a power flow in the dual-clutch transmission shown in FIG. 2 wherein the first gear is engaged. The torque which is introduced by the drive unit 2 in motor form is, via the outer clutch disks of the component clutch 4 owing to the full engagement of the inner clutch disks of the component clutch 4, introduced and transmitted via a shaft W1 which is part of the component transmission 6, wherein the torque is transmitted via the transmission ratio of the first gear further to a second shaft W2, in order to finally be transmitted, as output drive, to an output unit 3 in motor form.

Figure 4:
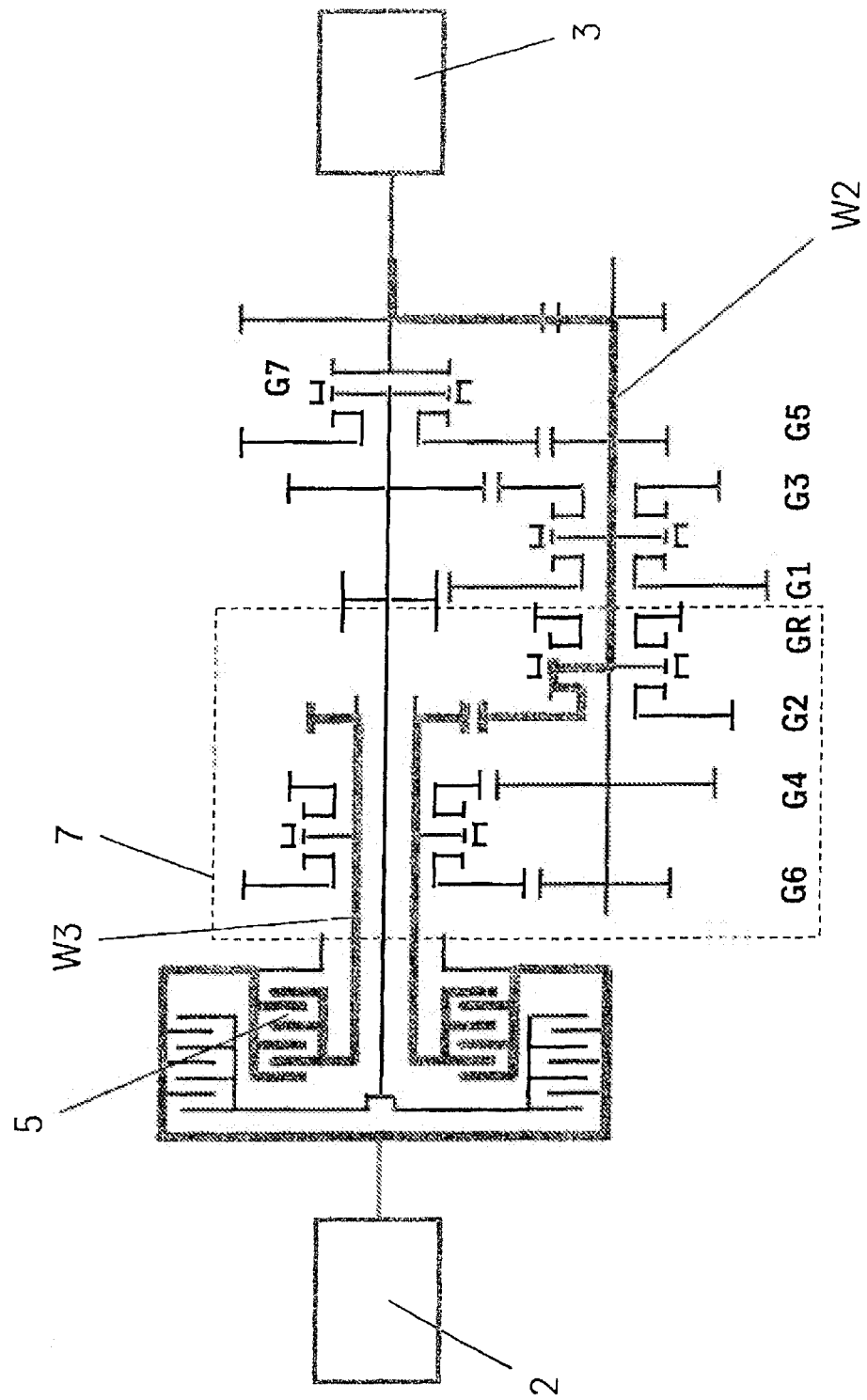
FIG. 4 shows a diagrammatic sketch of the dual-clutch transmission shown in FIG. 2 during an NVH test with a second gear engaged.

FIG. 4 schematically shows a dual-clutch transmission for testing and measurement which is of longitudinal type of construction, wherein in this case, an NVH test (noise measurement) such as is conventional from the prior art is performed. Here, a torque is introduced via an electromotive drive unit 2 initially into the inner second component clutch 5, wherein in this case, the clutch disks are in full engagement with one another such that the acting torque, reduced to a greater or lesser extent, is transmitted to a shaft W3, as part of the second component transmission 7, via the transmission ratio of the engaged second gear to a shaft W2, as part of the second component transmission 7, to the electromotive output unit 3. A corresponding NVH test is performed, with the second gear engaged, from a starting rotational speed up to an admissible maximum rotational speed of generally a few thousand revolutions per minute. Here, conventional vibration and acoustics sensors and corresponding electronic recording units are used to register the recorded values and analyze these in situ or later in order to identify any faults in the transmission.

Figure 5:
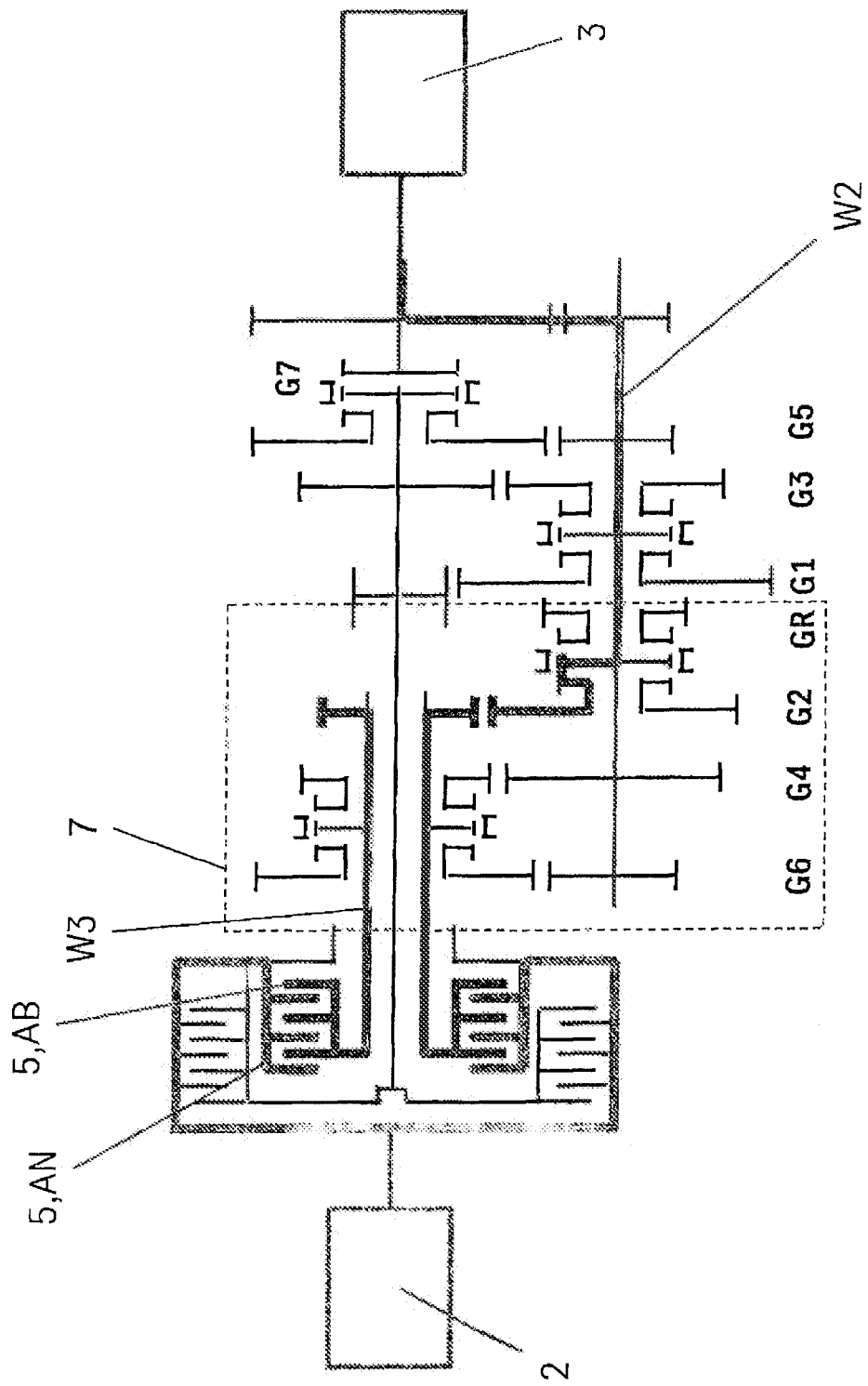
FIG. 5 shows a diagrammatic sketch of the transmission shown in FIG. 2 during a determination of the clutch characteristic curve of a component transmission.

FIG. 5 schematically shows the dual-clutch transmission, already shown above, of longitudinal type of construction, wherein in this case the torque that is introduced by means of the drive unit 2 is absorbed as a function of the degree of clutch engagement and/or of the clutch engagement travel, wherein the second component clutch 5 is, with regard to its clutch disks, transferred from a disengaged to a fully engaged state, in particular is partially engaged to a varying degree, in order for the torque absorption, which is dependent on degree of clutch engagement and/or on clutch engagement travel, to likewise be detected. Here, as a result of the, for the most part, partial engagement of the clutch disks in the second component clutch 5, a torque is transmitted via a shaft 3 of the second component transmission 7, via the transmission ratio of the second gear G2, to a further shaft W2 in order to ultimately be transmitted to the output unit 3. In this case, specifically the clutch characteristic curve of the component clutch 5 is determined by the absorption of the clutch torque versus the degree of clutch engagement or clutch engagement travel of the clutch disks of the second component clutch 5 with one another. Here, in the case of complete disengagement, the introduced torque at the output clutch side is zero, whereas in the case of full engagement of the clutch disks with one another, the output clutch torque virtually corresponds to the driving torque introduced by the motor drive unit 2.

Figure 6:
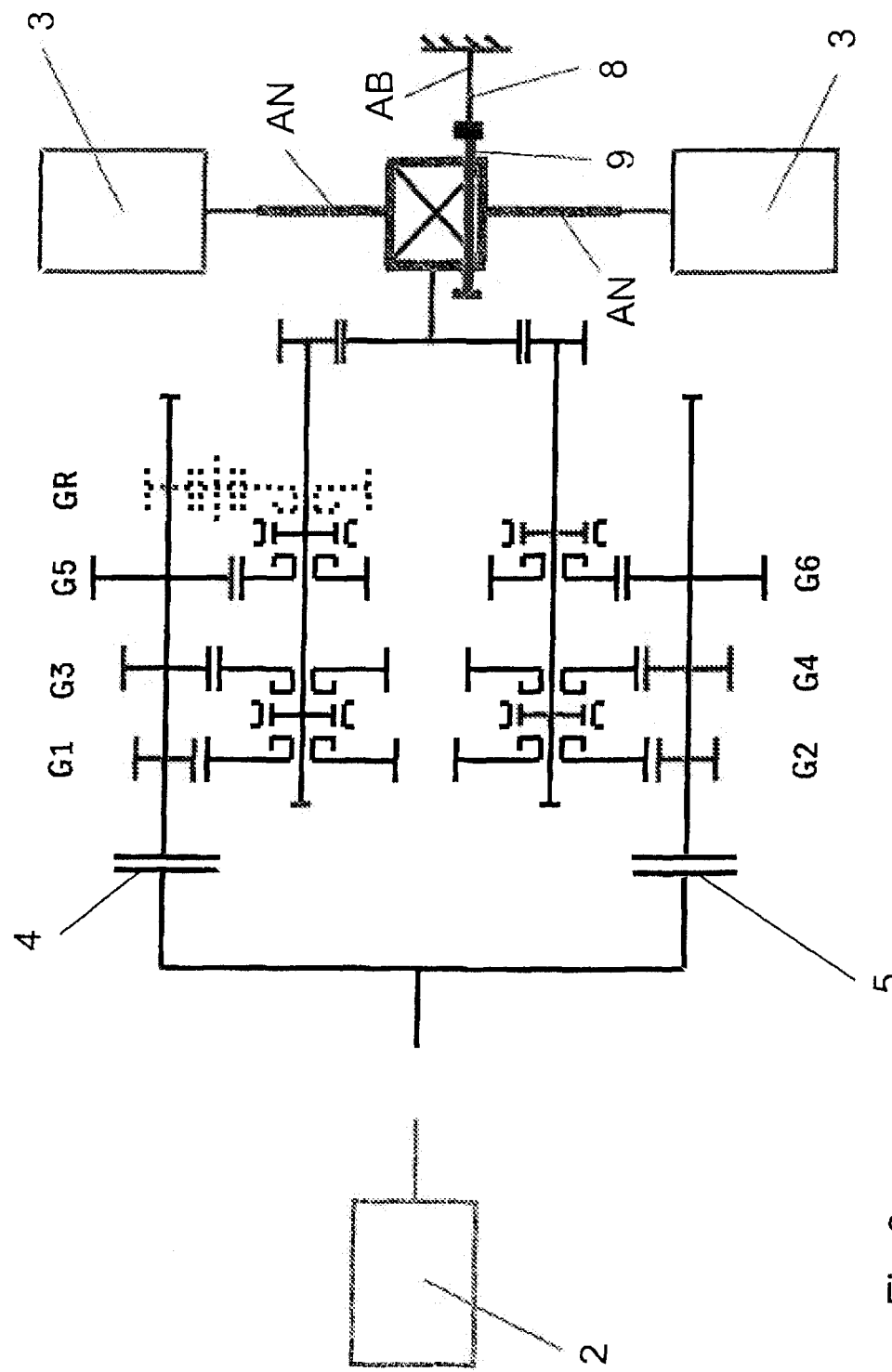
FIG. 6 shows a diagrammatic sketch of a dual-clutch transmission during a parking lock test.

FIG. 6 also schematically shows a parking lock test such as is conventional from the prior art, in which a mechanical locking element 8 engages with locking action into a gearwheel or shaft element 9, at least into a rotating element of a component transmission, such that subsequently, by means of the locking element 8 and on the latter via an output unit 3 which is functioning in traction operation and thus not in the parked state, now functioning as drive units, introduces a corresponding torque into the locking element 8 in order to test whether a torque of a certain magnitude up to a predefined maximum value is introduced with locking action into the locking element and into the transmission and also held therein, in order to ensure that, later, in the installed state in a vehicle, said vehicle can then in fact no longer roll away when in the parking lock mode.

Figure 7:
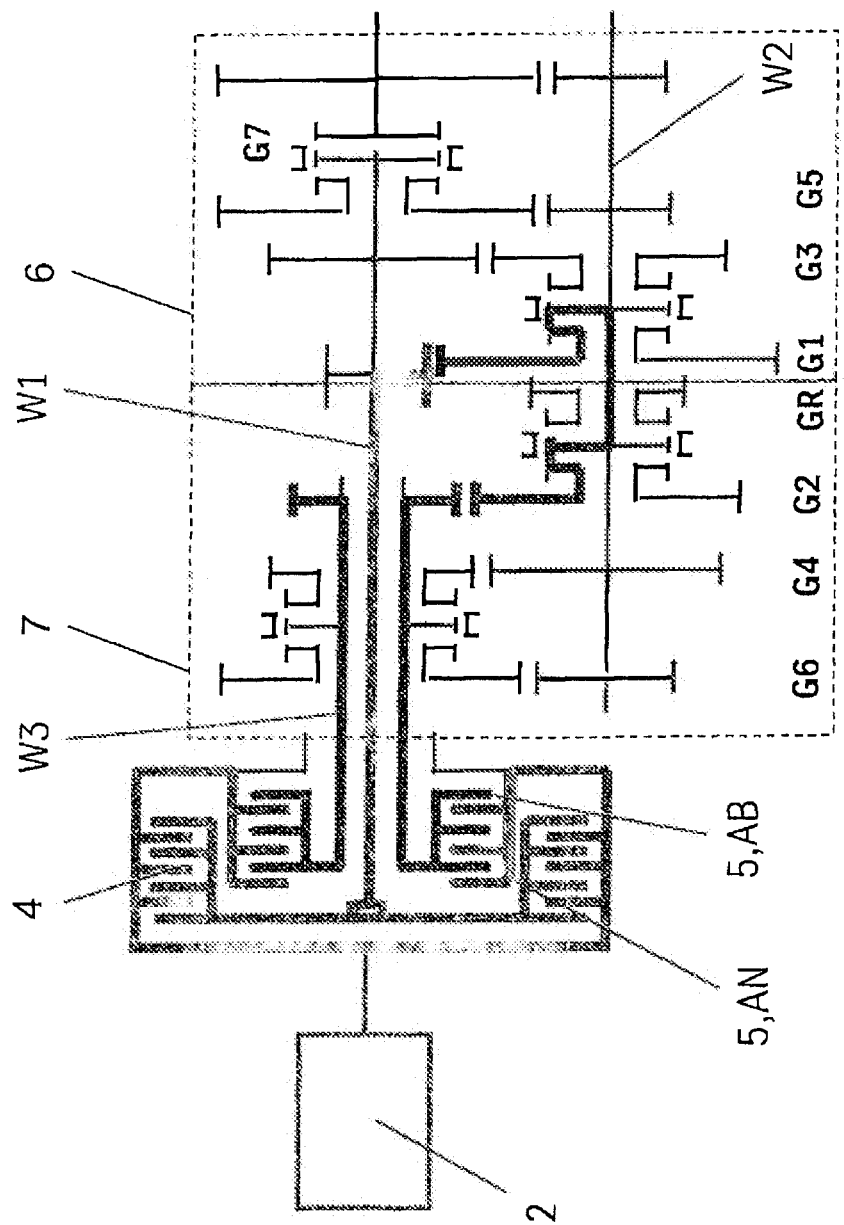
FIG. 7 shows the dual-clutch transmission shown in FIG. 2 during an NVH test according to the invention, but also in the case of an embodiment of a determination, according to the invention, of a clutch characteristic curve of a component transmission.

FIG. 7 shows, by way of a sketch, the functional principle with regard to an NVH test according to the invention. By means of a drive unit 2 in motor form, a torque is introduced into the first component clutch 4, which is fully engaged, and into the second component clutch 5, which is only partially engaged, wherein the first gear of the first component transmission 6 and the second gear of the second component transmission 7 are engaged, such that the torque introduced via the first component clutch 4 is then transmitted, with drive output action, into the first component transmission 6 via the shaft W1 via the transmission ratio of the first gear G1 through the transmission ratio of the second gear G2, such that the torque that is output is then ultimately converted into heat as a result of the partial engagement of the clutch disks of the second component clutch 5, such that ultimately the energy introduced by means of the introduced torque is converted into heat because the second component clutch 5 functions, in this test, as a friction brake. In this way, according to the invention, an external output device 3 is not required for performing the corresponding noise testing on the transmission. In general, the degrees of clutch engagement of the two component clutches are constant during an NVH measurement, wherein the rotational speed of the external drive unit and/or of the respective transmission gear shaft varies.

Figure 8:
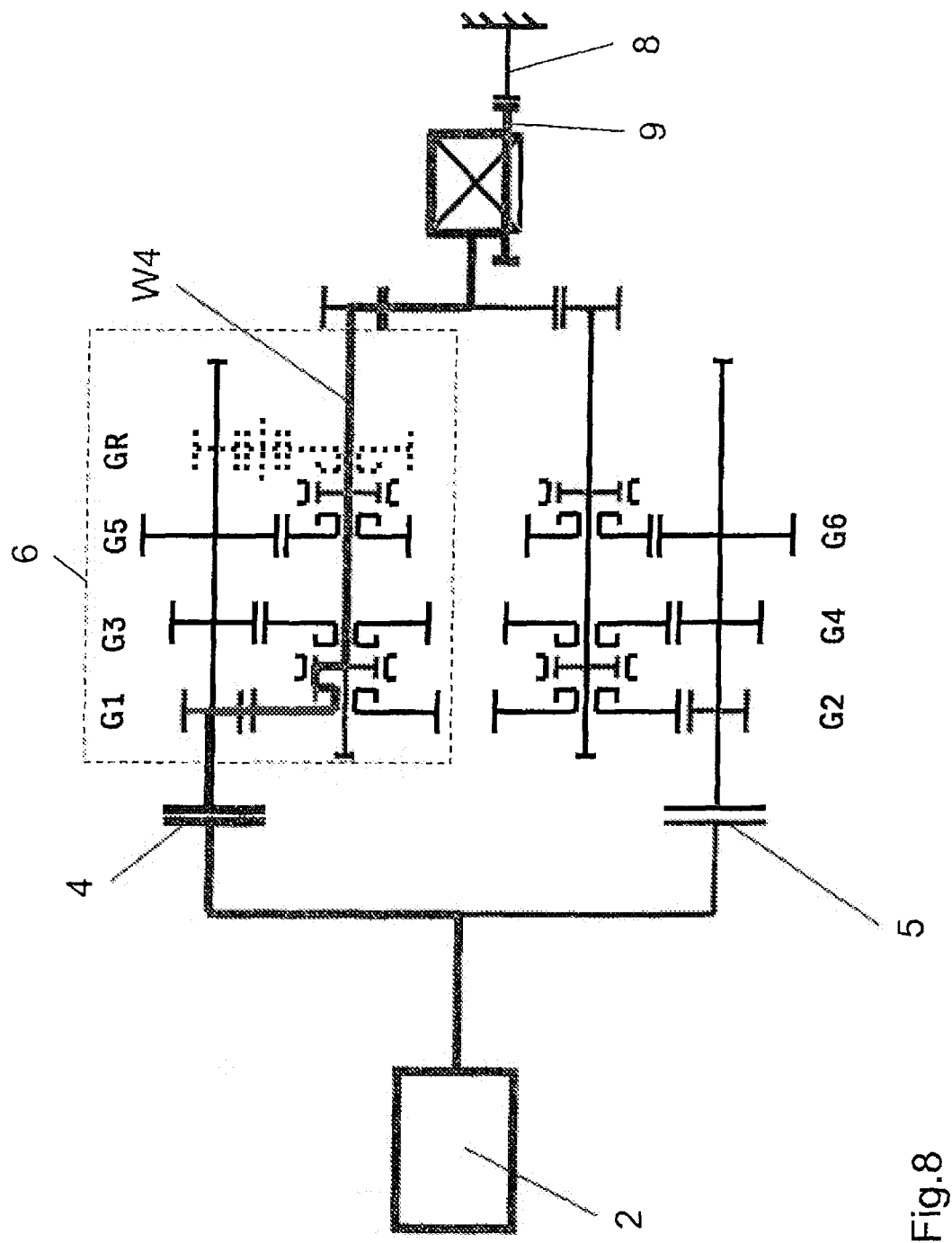
FIG. 8 shows a diagrammatic sketch of the dual-clutch transmission shown in FIG. 6 during a parking lock test according to the invention.

In FIG. 8, in a parking lock test according to the invention, by means of a drive unit 2 in motor form, a torque is introduced via a fully engaged first component clutch 4 and is transmitted via the transmission ratio of a first engaged gear G1, further via a transmission shaft W4 of a first component transmission 6, and is finally output with locking action in a locking element 8 of a parking lock unit, wherein the locking element 8 is for example and in particular in the form of a pawl and engages firmly with locking action into a gearwheel 9 which is connected to a shaft of the first component transmission 6. Instead of an output unit, such as is otherwise conventional from the prior art, then being used as a drive unit and a torque being applied directly to the locking element by an output unit that then functions as a drive, it falls within the scope of the invention for a corresponding torque generated by a drive unit 2 to be conducted through a component transmission of the dual-clutch transmission, and in this way, an output unit which is otherwise required and which then functions as drive unit in a classic parking lock test is not necessary.

Figure 9:
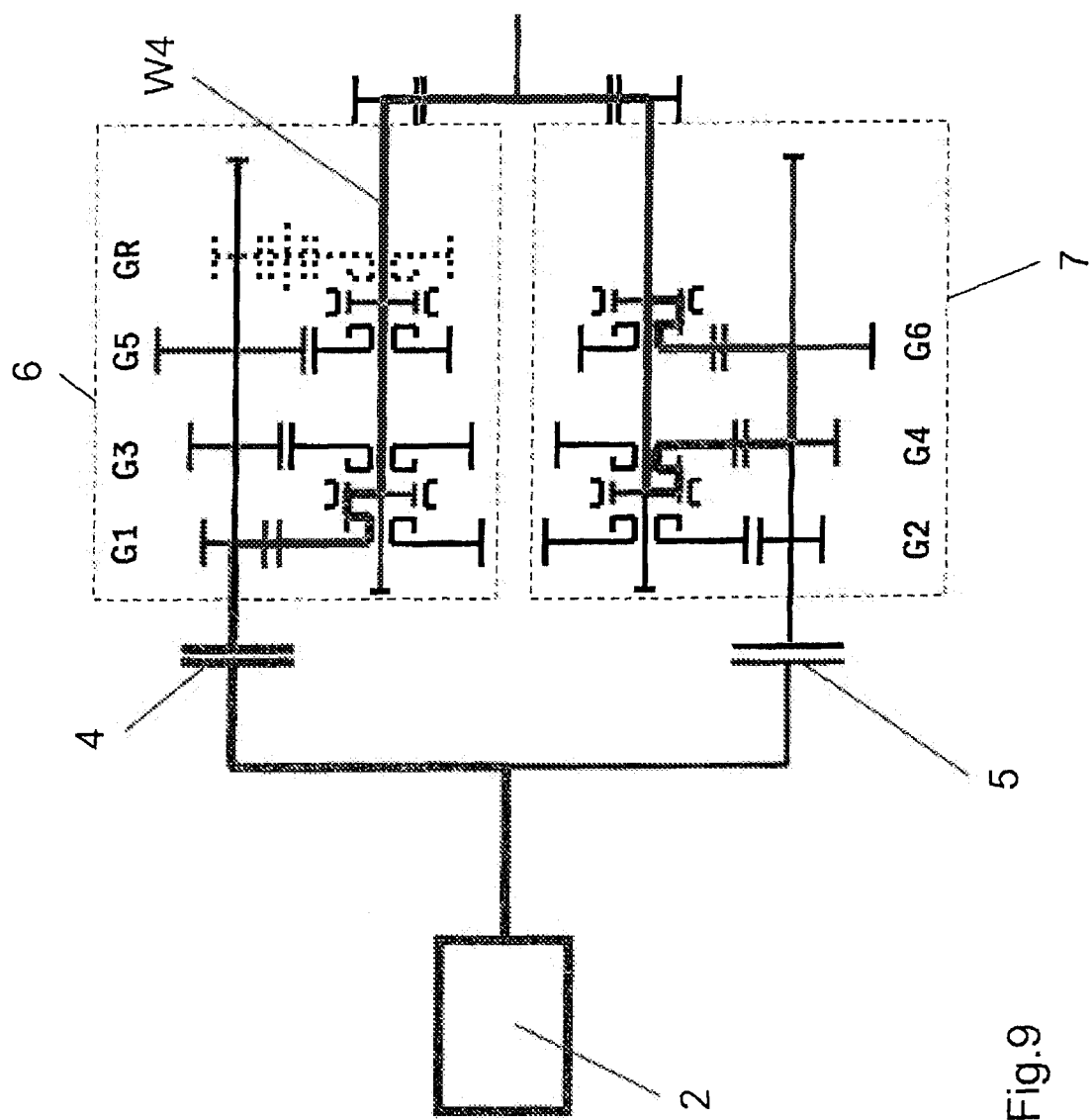
FIG. 9 shows a diagrammatic sketch of the dual-clutch transmission shown in FIG. 6 in the case of another embodiment of the parking lock test according to the invention.

FIG. 9 shows a variant of the parking lock test shown in FIG. 8, wherein in this case, two gears, specifically the fourth gear G4 and the sixth gear G6, are engaged in a second component transmission 7, such that now the second component transmission 7 is locked, such that without the engagement of the locking element 8, a corresponding torque can be transmitted via the engaged first component clutch 4 and the first component transmission 6 to the second component transmission 7 in order for this type of parking lock by engagement of two gears in a component transmission in a dual-clutch transmission to be correspondingly tested by assignment of a maximum torque value with regard to the parking lock function. Here, too, corresponding to the embodiment of FIG. 8, no external output unit is required.

FIG. 7 also shows, by way of a sketch, the functional principle with regard to an embodiment of the recording, according to the invention, of a clutch characteristic curve in a component transmission. By means of a drive unit 2 in motor form, a torque is introduced into the first component clutch 4, which is fully engaged, and into the second component clutch 5, which is only partially engaged, wherein the first gear of the first component transmission 6 and the second gear of the second component transmission 7 are engaged, such that the torque introduced via the first component clutch 4 is then transmitted, with drive output action, into the first component transmission 6 via the shaft W1 via the transmission ratio of the first gear G1 through the transmission ratio of the second gear G2, such that the torque that is output is then ultimately converted into heat as a result of the partial engagement of the clutch disks of the second component clutch 5, such that ultimately the energy introduced by means of the introduced torque is converted into heat because the second component clutch 5 functions, in this test, as a friction brake. In this way, according to the invention, an external output device 3 is not required for performing the corresponding recording of a clutch characteristic curve of a component clutch. In general, the rotational speed of the external drive unit or of the respective transmission input shaft is constant in order that, then, during the recording of a clutch characteristic curve of a component clutch, the clutch torque is determined as a function of the degree of clutch engagement and thus of a varying degree of clutch engagement.

Figure 10:
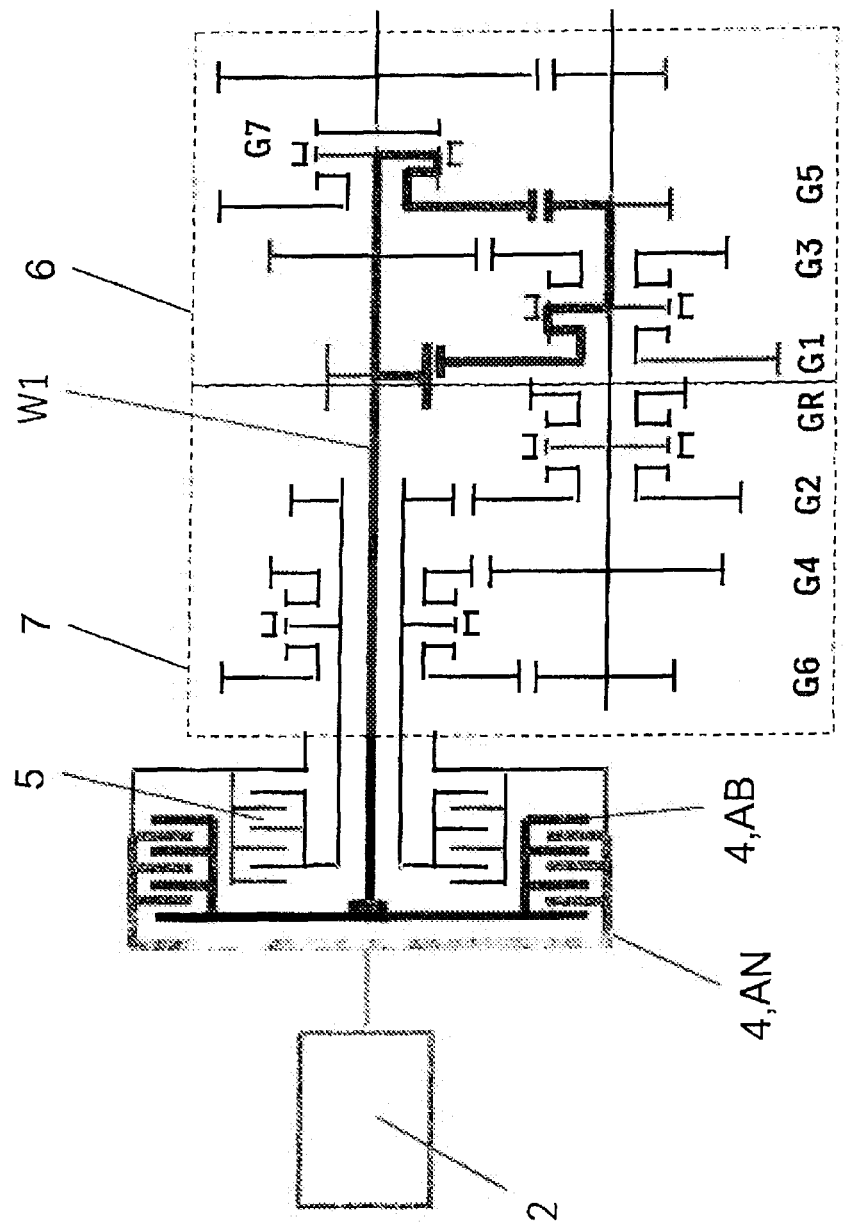
FIG. 10 shows a diagrammatic sketch of the dual-clutch transmission shown in FIG. 2 during the determination, according to the invention, of a clutch characteristic curve of a component transmission.

FIG. 10 shows the determination, according to the invention, of a clutch characteristic curve of a single component clutch of a dual-clutch transmission, wherein a drive unit 2 in motor form is used to input a torque into the first component clutch 4, which is partially engaged, wherein two gears of the associated first component transmission 6, specifically the first gear G1 and the fifth gear G5 are engaged, such that the first component transmission 6 is blocked/locked such that, then, as a result, an external output unit 3 is made superfluous because, as a result of the partial engagement of the clutch disks of the first component clutch 4, the introduced torque and the energy thus introduced are ultimately converted into heat within the first component clutch 4. Thus, as a function of the degree of clutch engagement and/or the clutch engagement travel, the corresponding input clutch torque, which corresponds substantially to the output clutch torque, can be measured, such that a corresponding clutch characteristic curve is determined in this way. It is self-evidently possible for a corresponding determination to also be performed for the second component clutch 5, wherein it is then also the case that two gears of the second component transmission 7 must be engaged in locking fashion, wherein these may for example be the second gear G2 and the sixth gear G6.

Figure 11:
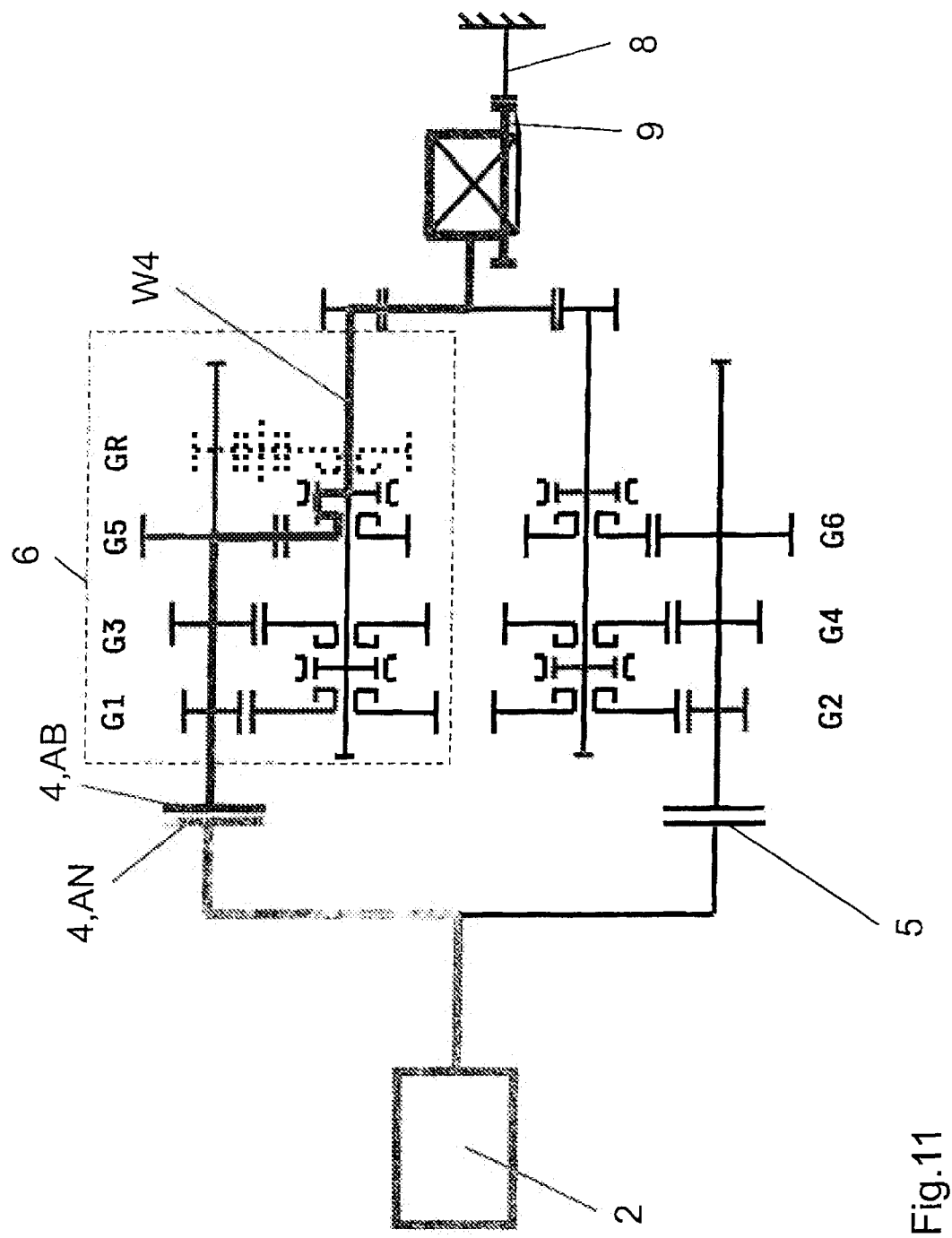
FIG. 11 shows a diagrammatic sketch of the dual-clutch transmission shown in FIG. 6 in the case of another embodiment of the determination, according to the invention, of a clutch characteristic curve of a component transmission.

FIG. 11 shows a first variant of the determination, according to the invention, of a clutch characteristic curve of a single component clutch of a dual-clutch transmission, wherein a drive unit 2 in motor form is used to input a torque into the first component clutch 4, which is partially engaged, wherein a fifth gear G5 of the associated first component transmission 6 is engaged, wherein a locking element 8, specifically a parking lock pawl of a parking lock unit 9, engages into the first component transmission 6 so as to lock the latter, wherein the partially to fully engaged component clutch 4 of the first component transmission 6 is actuated such that the clutch torque is determined as a function of the degree of clutch engagement and/or of the clutch engagement travel.

Figure 12:
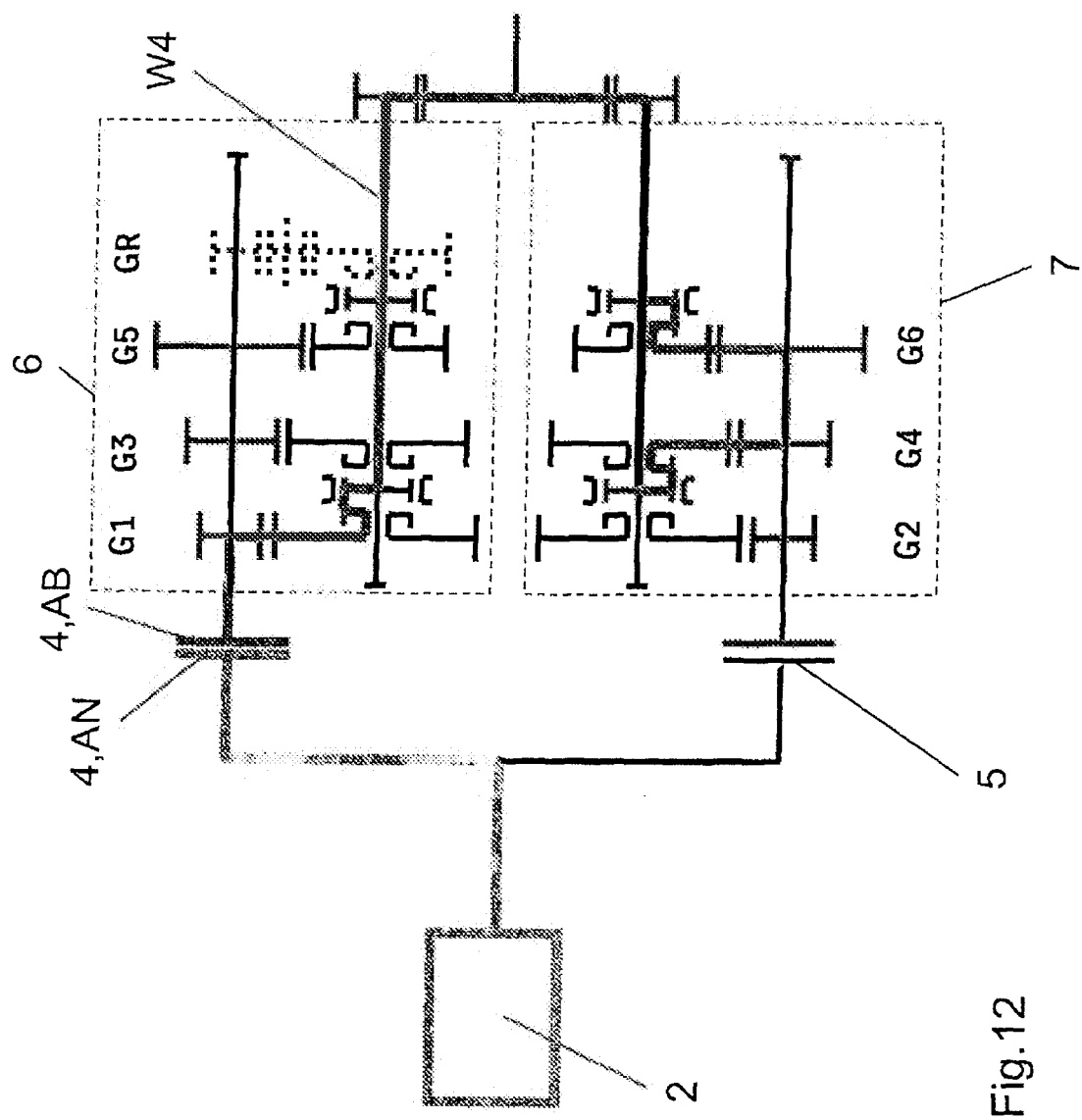
FIG. 12 shows a diagrammatic sketch of the dual-clutch transmission shown in FIG. 6 in the case of a further embodiment during the determination, according to the invention, of a clutch characteristic curve of a component transmission.

FIG. 12 shows a second variant of the determination, according to the invention, of a clutch characteristic curve of a single component clutch of a dual-clutch transmission, wherein a drive unit 2 in motor form is used to input a torque into the first component clutch 4, which is partially engaged, wherein a first gear G1 of the first component transmission 6 is engaged and a fourth gear G4 and a sixth gear G6 of a second component transmission 7 are engaged, wherein a second component clutch 5 of the second component transmission 7 is disengaged, wherein, in this configuration, the clutch torque is determined as a function of the degree of clutch engagement and/or of the clutch engagement travel of the first clutch 4.

Various embodiments of the present invention will be disclosed below, again in general form:

First Embodiment

Transmission-preloading method for the measurement and testing of a transmission, in particular a dual-clutch transmission 1, which has at least two component transmissions, in which method a torque is introduced into the transmission 1 by means of a drive unit 2 which is external with respect to the transmission 1 and defined with respect to traction operation, characterized in that the transmission 1 is placed into an operating state in which the introduced torque is absorbed by means of at least one part of the transmission 1, in such a way that the measurement and/or testing is performed without an output unit 3 which is external with respect to the transmission 1 and defined with respect to traction operation.

Second Embodiment

Method according to the first embodiment, wherein, in an NVH test, drive is output, with slip, in at least one component clutch 4, 5 of the transmission 1, this being generated by slipping, partial engagement of at least one component clutch 4, 5 of a component transmission 6, 7, wherein a gear G1-G7, GR is engaged in each component transmission 6, 7, wherein a) the one component clutch 4 of the first component transmission 6 is partially engaged so as to exhibit slip and the one component clutch 5 of the second component transmission 7 is partially to fully engaged without slip, and no component clutch 4, 5 is disengaged, or b) the one component clutch 5 of the second component transmission 7 is partially engaged so as to exhibit slip and the one component clutch 4 of the first component transmission 6 is partially to fully engaged without slip, and no component clutch 4, 5 is disengaged.

Third Embodiment

Method according to the second embodiment, wherein a) firstly variant a) of the second embodiment and subsequently variant b) of the second embodiment are performed, or b) firstly variant b) of the second embodiment and subsequently variant a) of the second embodiment are performed.

Fourth Embodiment

Method according to the first embodiment, wherein, in a parking lock test, a locking element 8 engages into a component transmission 6, 7 so as to lock the latter, wherein the drive unit 2, via said component transmission 6, 7, preloads the parking lock unit, wherein a gear G1-G7, GR of said component transmission 6, 7 is engaged and a component clutch 4, 5 of said component transmission 6, 7 is partially to fully engaged so as to exhibit slip or without slip.

Fifth Embodiment

Method according to the first embodiment, characterized in that, in a parking lock test, a) at least two gears G1-G7, GR of a second component transmission 7 are engaged and a gear G1-G7, GR of a first component transmission 6 is engaged and the component clutch 4 of the first component transmission 6 is partially to fully engaged so as to exhibit slip or without slip, or b) at least two gears G1-G7, GR of a first component transmission 6 are engaged and a gear G1-G7, GR of a second component transmission 7 is engaged and the component clutch 5 of the second component transmission 7 is partially to fully engaged so as to exhibit slip or without slip.

Sixth Embodiment

Method according to the first embodiment, characterized in that, during recording of a clutch characteristic curve of a component clutch 4, 5 in a component transmission 6, 7 of the transmission 1, drive is output, with slip, in a component clutch 4, 5 of the transmission 1, this being generated by slipping, partial engagement of a component clutch 4, 5 of a component transmission 6, 7, wherein a gear 61-67, 68 is engaged in each component transmission 6, 7, wherein a) the one component clutch 4 of the first component transmission 6 is partially engaged so as to exhibit slip and the one component clutch 5 of the second component transmission 7 is partially to fully engaged without slip, and no component clutch 4, 5 is disengaged, wherein the clutch torque is determined as a function of the degree of clutch engagement and/or the clutch engagement travel, or b) the one component clutch 5 of the second component transmission 7 is partially engaged so as to exhibit slip and the one component clutch 4 of the first component transmission 6 is partially to fully engaged without slip, and no component clutch 4, 5 is disengaged, wherein the clutch torque is determined as a function of the degree of clutch engagement and/or the clutch engagement travel.

Seventh Embodiment

Method according to the first embodiment, characterized in that, during recording of a clutch characteristic curve of a component clutch in a component transmission 6, 7, at least two gears G1-G7, GR of the one component transmission 6, 7 are engaged, wherein the component clutch 4, 5 of the component transmission 6, 7 is partially to fully engaged so as to exhibit slip and the clutch torque generated by the external drive unit is determined as a function of the degree of clutch engagement and/or the clutch engagement travel.

Eighth Embodiment

Method according to the first embodiment, characterized in that, during recording of a clutch characteristic curve of a component clutch in a component transmission 6, 7, at least one gear G1-G7, GR of the one component transmission 6, 7 is engaged, and a locking element 8 engages into the component transmission 6, 7 so as to lock the latter, wherein the component clutch 4, 5 of the component transmission 6, 7 is at least partially engaged so as to exhibit slip and the clutch torque generated by the external drive unit is determined as a function of the degree of clutch engagement and/or the clutch engagement travel.

Ninth Embodiment

Method according to the first embodiment, characterized in that, during recording of a clutch characteristic curve in a component transmission 6, 7, at least one gear G1-G7, GR of the one component transmission 6, 7 is engaged and at least two gears G1-G7, GR of a further component transmission 6, 7 are engaged, a) wherein a component clutch 5 of the further component transmission 7 is disengaged, wherein a component clutch 4 of the one component transmission 6 is partially to fully engaged so as to exhibit slip, and the clutch torque is determined as a function of the degree of clutch engagement and/or the clutch engagement travel, or b) a component clutch 4 of the one component transmission 6 is disengaged, wherein a component clutch 5 of the further component transmission 7 is partially to fully engaged so as to exhibit slip, and the clutch torque is determined as a function of the degree of clutch engagement and/or the clutch engagement travel.

Tenth Embodiment

Transmission testing and measurement apparatus, having a drive unit 2 which drives the transmission for testing, in particular dual-clutch transmission 1, which has at least two component transmissions 6, 7, wherein the apparatus has no output unit 3 which is external with respect to the transmission 1 for testing and defined with respect to traction operation.

Eleventh Embodiment

Apparatus according to the tenth embodiment, wherein said apparatus is designed such that, during a transmission-preloading method for the measurement and testing of a transmission, in particular dual-clutch transmission 1, which has at least two component transmissions 6, 7, a drive unit 2 which is external with respect to the transmission 1 is used to introduce a torque in the transmission 1, wherein the transmission 1 is or can be placed into an operating state in which the introduced torque is absorbed by means of at least one part of the transmission 1 such that the measurement and/or testing is or can be performed without a drive unit which is external with respect to the transmission and defined with respect to traction operation.

Twelfth Embodiment

Apparatus according to either of the tenth and eleventh embodiments, wherein said apparatus is designed such that the method according to one of the first to ninth embodiments is or can be performed during operation.

Thirteenth Embodiment

Use of a transmission, in particular a dual-clutch transmission, which has at least two component transmissions, for carrying out the method according to one of the first to ninth embodiments.

Fourteenth Embodiment

Use of a transmission, in particular a dual-clutch transmission, which has at least two component transmissions, in an apparatus according to one of the tenth to twelfth embodiments.

The invention claimed is:

1. A method for the testing of a transmission, in particular a dual-clutch transmission, wherein a torque is introduced into the transmission by means of a drive unit which is external with respect to the transmission, characterized in that the transmission is placed into an operating state in which an internal component of the transmission functions as a brake for simulation of an output unit.

2. The method as claimed in claim 1, wherein the transmission has a clutch which is partially engaged in order to function as a brake, in particular a friction brake.

3. The method as claimed in claim 1, wherein the transmission comprises a first component clutch and a second component clutch, wherein the first component clutch is assigned to a first component transmission of the transmission, and the second component clutch is assigned to a second component transmission of the transmission, wherein the first component clutch is fully engaged in order to transmit the torque to the first component transmission, and wherein both a gear of the first component transmission and also a gear of the second component transmission are engaged in order to transmit the torque from the first component transmission to the second component transmission, and wherein the second component clutch is partially engaged in order to function as a friction brake.

4. The method as claimed in claim 1, wherein, for recording of a clutch characteristic curve, the second component clutch is engaged to such an extent that the second component clutch is just free from slip, and a clutch torque is then determined as a function of the degree of clutch engagement.

5. The method as claimed in claim 3, wherein, for switching between traction operation and operation under load, the first component clutch is transferred from the fully engaged state into the partially engaged state, and the second component clutch is transferred from the partially engaged state into the fully engaged state.

6. The method for testing a transmission as claimed in claim 1, wherein the transmission is placed into an operating state in which the transmission is blocked by means of at least one internal component of the transmission.

7. The method as claimed in claim 6, wherein the at least one internal component is a parking lock of the transmission, which parking lock is placed into a park position which locks the transmission.

8. The method as claimed in claim 6, wherein, for the blocking of the transmission, at least two gears of the transmission are engaged simultaneously.

9. The method as claimed in claim 8, wherein the transmission comprises a first component clutch and a second component clutch, wherein the first component clutch is assigned to a first component transmission of the transmission and the second component clutch is assigned to a second component transmission of the transmission, wherein the first component clutch is fully engaged and wherein a gear of the first component transmission is engaged and wherein, for the blocking of the transmission, at least two gears of the second component transmission are engaged simultaneously.

10. The method as claimed in claim 1, wherein the torque introduced by the drive unit is evaluated.

11. The method as claimed in claim 1, wherein an NVH noise measurement is performed.

12. A test stand for testing a transmission, in particular for carrying out a method as claimed in claim 1, wherein the test stand has a drive unit for introducing a torque into the transmission, and wherein the test stand is provided for controlling a clutch of the transmission and for shifting gears of the transmission, characterized in that the test stand is configured for performing shifts in the transmission such that an internal component of the transmission functions as a brake for simulation of a drive unit.

13. The test stand as claimed in claim 12, wherein the test stand is configured such that a first component clutch of the transmission is fully engaged and a gear of a first component transmission assigned to the first component clutch is engaged, and such that a second component clutch of the transmission is partially engaged and a gear of a second component transmission assigned to the second component clutch is engaged.

14. The test stand as claimed in claim 13, wherein the test stand is provided for engaging the second component clutch such that the second component clutch is just free from slip, wherein the test stand is furthermore provided for measuring the degree of clutch engagement of the second component clutch.

15. The test stand as claimed in claim 12, wherein the test stand has structure-borne noise sensors for performing an NVH noise measurement and has a torque sensor for measuring the torque introduced into the transmission.

* * * * *